(12) United States Patent
Shirahige et al.

(10) Patent No.: US 8,255,632 B2
(45) Date of Patent: Aug. 28, 2012

(54) PRE-FETCH CONTROL APPARATUS

(75) Inventors: Yuji Shirahige, Kawasaki (JP); Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1036 days.

(21) Appl. No.: 12/199,485

(22) Filed: Aug. 27, 2008

(65) Prior Publication Data

US 2008/0320229 A1  Dec. 25, 2008

Related U.S. Application Data

(63) Continuation of application No. PCT/JP2006/303663, filed on Feb. 28, 2006.

(51) Int. Cl.
*G06F 12/00* (2006.01)
*G06F 13/00* (2006.01)

(52) U.S. Cl. ........ 711/137; 711/100; 711/117; 711/118; 711/154

(58) Field of Classification Search .................. 711/100, 711/117, 118, 137, 154
See application file for complete search history.

(56) References Cited

U.S. PATENT DOCUMENTS

| | | | | |
|---|---|---|---|---|
| 4,807,110 A | * | 2/1989 | Pomerene et al. | 711/213 |
| 5,170,476 A | * | 12/1992 | Laakso et al. | 711/140 |
| 5,418,973 A | * | 5/1995 | Ellis et al. | 712/3 |
| 5,544,342 A | * | 8/1996 | Dean | 711/119 |
| 5,664,147 A | * | 9/1997 | Mayfield | 711/137 |
| 6,070,230 A | | 5/2000 | Capps | |
| 6,173,392 B1 | | 1/2001 | Shinozaki | |
| 6,954,840 B2 | * | 10/2005 | Cooksey et al. | 711/203 |
| 2004/0003179 A1 | | 1/2004 | Shirahige et al. | |
| 2006/0026594 A1 | | 2/2006 | Yoshida et al. | |

FOREIGN PATENT DOCUMENTS

| | | |
|---|---|---|
| EP | 1622003 A1 | 2/2006 |
| JP | 11-161489 | 6/1999 |
| JP | 11-167520 | 6/1999 |
| JP | 11-316710 | 11/1999 |
| JP | 2004-38345 | 2/2004 |
| JP | 2006-40141 | 2/2006 |

OTHER PUBLICATIONS

International Search Report mailed Aug. 22, 2006 in connection with the International Application No. PCT/JP2006/303663.

* cited by examiner

*Primary Examiner* — Tuan V. Thai
(74) *Attorney, Agent, or Firm* — Staas & Halsey LLP

(57) ABSTRACT

A pre-fetch control apparatus is equipped with a next-line pre-fetch control apparatus 38. An address overflowed from a pre-fetch address queue 26 is stored in the next-line pre-fetch control apparatus 38. An access address issued by a processor unit and stored in a register 25 is compared with the address stored in the next-line pre-fetch control apparatus 38 and, if the two addresses are identical, a value obtained by adding a data block size $\lambda$ of cache memory to the address stored in the next-line pre-fetch control apparatus 38 is stored again in the next line pre-fetch control apparatus 38. When the address issued by the processor unit is identical with that stored in the next-line pre-fetch control apparatus 38 a predetermined number of times, the occurrence of continuous accesses is presumed and pre-fetching is carried out for all addresses that have not hit the pre-fetch address queue.

7 Claims, 14 Drawing Sheets

|     | (a)     | (b)     | (c)     | (d)     | (e)     | (f)         |
|-----|---------|---------|---------|---------|---------|-------------|
| (1) | A+λ     | B+λ     | C+λ     | D+λ     | E+λ     | A+2λ        |
| (2) | empty   | A+λ     | B+λ     | C+λ     | D+λ     | E+λ         |
| (3) | empty   | empty   | A+λ     | B+λ     | C+λ     | D+λ         |
| (4) | empty   | empty   | empty   | A+λ     | B+λ     | C+λ         |
| (5) | empty   | empty   | empty   | empty   | A+λ     | A+2λ        |

F I G. 3

|     | (a) | (b) | (c) | (d) | (e) | (f) |
|-----|-----|-----|-----|-----|-----|-----|
| (1) | $E+m\lambda$ | $A+(m+1)\lambda$ | $B+(m+1)\lambda$ | $C+(m+1)\lambda$ | $D+(m+1)\lambda$ | $E+(m+1)\lambda$ |
| (2) | $D+m\lambda$ | $E+m\lambda$ | $A+(m+1)\lambda$ | $B+(m+1)\lambda$ | $C+(m+1)\lambda$ | $D+(m+1)\lambda$ |
| (3) | $C+m\lambda$ | $D+m\lambda$ | $E+m\lambda$ | $A+(m+1)\lambda$ | $B+(m+1)\lambda$ | $C+(m+1)\lambda$ |
| (4) | $B+m\lambda$ | $C+m\lambda$ | $D+m\lambda$ | $E+m\lambda$ | $A+(m+1)\lambda$ | $B+(m+1)\lambda$ |

|     | (a) | (b) | (c) | (d) | (e) | (f) |
|-----|-----|-----|-----|-----|-----|-----|
| (5) | $A+m\lambda$ | $A+(m+1)\lambda$ | $A+(m+1)\lambda$ | $A+(m+1)\lambda$ | $A+(m+1)\lambda$ | $A+(m+1)\lambda$ |

FIG. 4

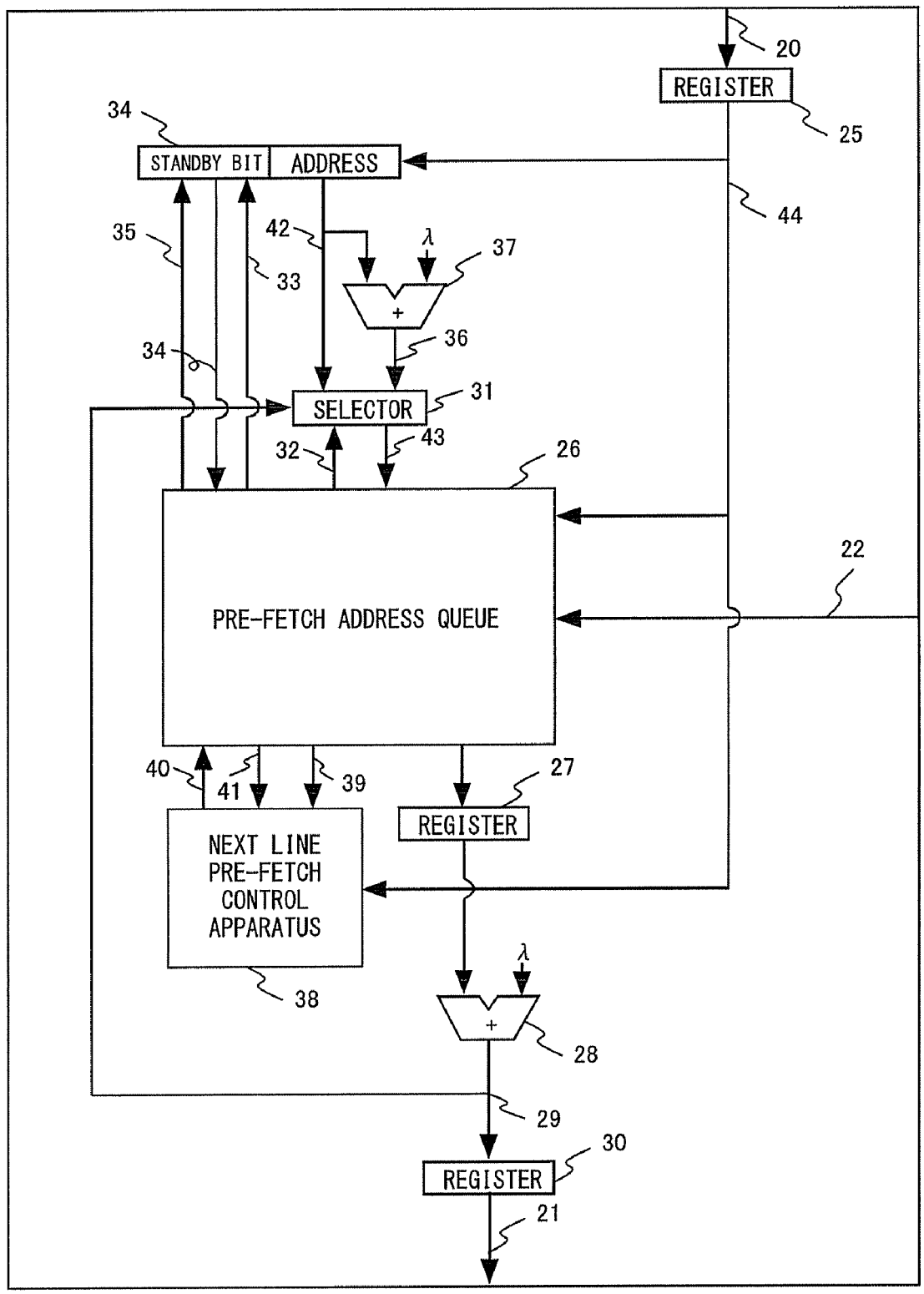
F I G. 6

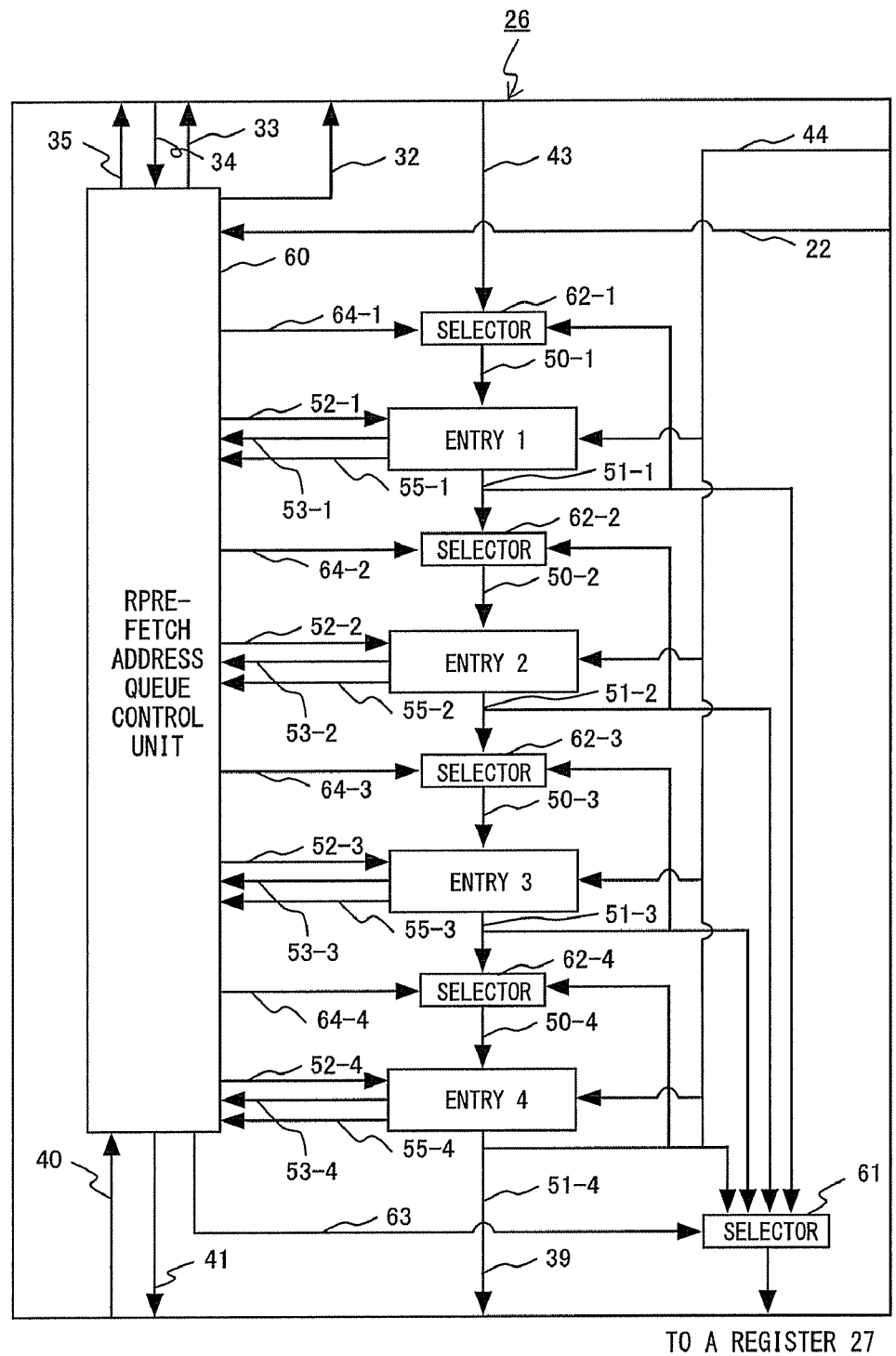
F I G. 7

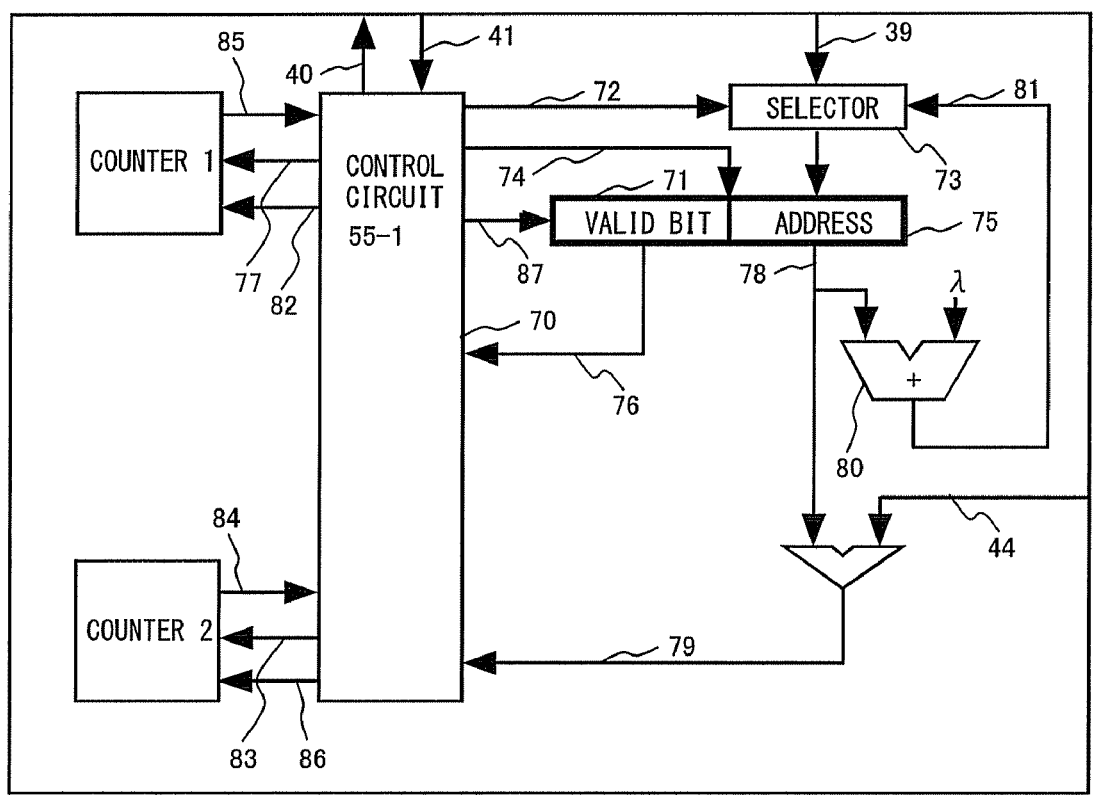
F I G. 9

PRE-FETCH CONTROL APPARATUS

CROSS-REFERENCE TO RELATED APPLICATION

This application is a continuation of a PCT application, PCT/JP 2006/303663, filed on Feb. 28, 2006.

BACKGROUND OF THE INVENTION

1. Field of the Invention

The present invention relates to a pre-fetch control apparatus for use in an information processing apparatus comprising cache memory.

2. Description of the Related Art

A high-speed access to memory has been conventionally devised by providing cache memory between a central processing unit (CPU) and a main storage apparatus. In recent years, the time required for a memory access to access a main storage apparatus has become large compared to the increased speed of the instruction execution cycle of a CPU, requiring further improvements in the hit ratio of cache memory and in cache miss latency. A method called a pre-fetch has been used as one countermeasure to such a problem. The pre-fetch is used for lowering a cache miss ratio by pre-reading, in cache memory, an instruction or data that will be needed in the near future.

There is, however, a possibility of expelling necessary data from the cache if extraneous data is pre-fetched, possibly resulting in increasing the cache miss ratio. Because of this, an important problem to be solved is how the address of data to be pre-fetched is to be predicted. For example, reference patent document 1 has proposed a method for finding out an address in which continuous lines have been accessed in the past by registering a cache-accessed address in an access queue and for obtaining a pre-fetch address on the basis of the found address, thereby preventing extraneous pre-fetches.

In the conventional technique, however, there have been cases in which an entry or entries overflow from a pre-fetch address queue if there is a series of memory accesses exceeding the number of entries of the aforementioned queue, resulting in a malfunction of the pre-fetch.

Patent document 1: Laid-Open Japanese Patent Application Publication No. 2004-38345

SUMMARY OF THE INVENTION

The object of the present invention is to provide a pre-fetch control apparatus capable of pre-fetching effectively even if there have been continuous memory accesses in excess of the number of entries of a pre-fetch address queue.

According to the present invention, a pre-fetch control apparatus controlling a pre-fetch from a main storage apparatus to cache memory in an information processing apparatus comprising the main storage apparatus, cache memory and a processor, comprises: a pre-fetch address queue unit for storing a plurality of addresses to be compared with an address of an access from the processor in order to request the cache memory for a pre-fetch; and a next-line pre-fetch control unit for storing an address that has overflowed from the pre-fetch address queue unit, rewriting the address to the following address if the processor has accessed an address identical with the stored address, and carrying out a next-line pre-fetch, that is, pre-fetching the address following an access address that has been miss-cached thereafter if there have been a predetermined number of continuous accesses from the processor to an address that is identical with the stored address.

BRIEF DESCRIPTION OF THE DRAWINGS

FIG. 3 is a diagram describing an outline of the operation of a preferred embodiment of the present invention (part 3);

FIG. 4 is a diagram describing an outline of the operation of a preferred embodiment of the present invention (part 4);

FIG. 6 is a diagram showing the internal configuration of the pre-fetch control apparatus shown in FIG. 5;

FIG. 7 is a diagram showing the configuration of the pre-fetch address queue shown in FIG. 6 (part 1);

FIG. 9 is a diagram showing the configuration of a next-line pre-fetch control apparatus;

DESCRIPTION OF THE PREFERRED EMBODIMENTS

A preferred embodiment of the present invention is configured to retain an entry that has overflowed from a pre-fetch address queue in a register for a certain period of time and, in the meantime, to count the number of times the register and the address to which accesses have been carried out match. Then, a pre-fetch is controlled on the basis of the counted number of times. With this configuration, when an entry is overflowed, a pre-fetch is requested if the access is continuous, while a pre-fetch is not requested if the access is random. That is, the embodiment of the present invention is configured to control in such a manner so as to pre-fetch an address obtained by adding a block size $\lambda$ to a miss-cached address (noted as "next-line pre-fetch" hereinafter) under a specific condition. Here, the block size $\lambda$ is the block size of a data block that is the unit of storing data in the primary and secondary caches.

Figure 1:
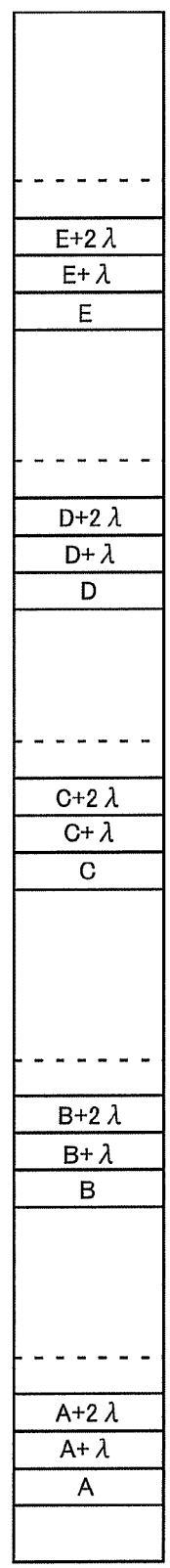
FIG. 1 is a diagram describing an outline of the operation of a preferred embodiment of the present invention (part 1)

FIGS. 1 through 4 are diagrams describing an outline of the operation of a preferred embodiment of the present invention. The operation of a pre-fetch control apparatus when accessing the continuous areas in parallel starting from the addresses A, B, C and D as shown in FIG. 1 is described. If there are five or more continuous accesses while the number of entries for a pre-fetch address queue is four, then the pre-fetch address queue will be unable to request a pre-fetch for the overflowed access, in spite of continuous accesses, as described in the following.

(1) through (4) in FIG. 3 indicate the respective states of entries 1, 2, 3 and 4 of the pre-fetch address queue. (5) indicates the states of the next-line pre-fetch control apparatus equipped in the preferred embodiment of the present invention. FIG. 3 (*a*) shows, first, the state in which a cache miss occurs at an address A, and an address A+λ is registered in a pre-fetch address queue. Here, "λ" is the size of a data block stored in the cache memory. FIG. 3 (*b*) shows the state in which a cache miss occurs at an address B, and an address B+λ is registered. FIG. 3 (*c*) shows the state in which a cache miss occurs at an address C, and an address C+λ is registered. FIG. 3 (*d*) shows the state in which a cache miss occurs at an address D, and an address D+λ is registered. FIG. 3 (*e*) shows the state in which a cache miss occurs at an address E, and an address E+λ is registered. In this event, the address A+λ of entry (4) is overflowed from the pre-fetch address queue and set in the next-line pre-fetch control apparatus (5). FIG. 3 (*f*) shows the state of the queue when the cache miss occurred at the address A+λ. Since the A+λ has been expelled from the pre-fetch address queue at the stage of FIG. 3 (*e*), the pre-fetch address queue is not hit. Therefore, a pre-fetch request cannot be made. Instead, an address registered in the next-line pre-fetch control apparatus is hit, and an address A+2λ will be registered.

FIG. 4 shows how a next-line pre-fetch is actually requested. FIG. 4 (1) through (4) shows the respective states of the entries 1, 2, 3 and 4 of the pre-fetch address queue. FIG. 4 (5) shows the states of the next-line pre-fetch control apparatus. FIG. 4 (*a*) shows the state in which there have been continuous accesses from the addresses A to A+(m−1) λ, from B to B+(m−1) λ, from C to C+(m−1) λ, from D to D+(m−1), and from E to E+(m−1) λ, hitting the addresses of the next-line pre-fetch control apparatus (m−1) times as a result. Respective addresses next to the miss-cached addresses are set in the individual pre-fetch address queues (1) through (4) and in the next-line pre-fetch control apparatus (5). FIG. 4 (*b*) shows the state in which a cache miss has occurred at the address A+mλ. The next-line pre-fetch control apparatus is hit and the address is updated to A+(m+1). The number of hits has exceeded a threshold number m and therefore the mode is changed to a mode requesting a next-line pre-fetch. This prompts the occurrence of a cache miss at an address A+mλ that is not primarily among the addresses existing in the pre-fetch address queues, and therefore a pre-fetch request to the next address, i.e., A+(m+1) λ, should not have been made. In this case, however, the mode has been changed to a mode requesting a next-line pre-fetch, and therefore a pre-fetch is requested to an address A+(m+1) λ and the address A+(m+1) λ is registered in the pre-fetch address queue. FIG. 4 (*c*) shows the state in which a cache miss has occurred at the address B+mλ. In this case, even though the address B+mλ does not hit either the pre-fetch address queue or the next-line pre-fetch control apparatus, the latter, however, is in a next-line pre-fetch request mode. FIG. 4 (*c*) therefore shows the state in which the next-line pre-fetch control apparatus requests an address B+(m+1) λ for a pre-fetch, as in the case of A+mλ, and in which the address B+(m+1) λ is registered in the pre-fetch address queue. FIG. 4 (*d*) shows the state in which a cache miss has occurred at the address C+(m+1) λ. The present apparatus is also in a next-line pre-fetch request mode, and therefore it requests the address C+(m+1) λ for a pre-fetch, and the address C+(m+1) λ is registered in the pre-fetch address queue. FIG. 4 (*e*) shows the state in which a cache miss has occurred at the address D+(m+1) λ. Since the next-line pre-fetch control apparatus is in the next-line pre-fetch request mode, the present apparatus requests the address D+(m+1) λ for a pre-fetch, and the address D+(m+1) λ is registered in the pre-fetch address queue. FIG. 4 (*f*) shows the next-line pre-fetch request mode, and therefore shows the state in which a cache miss has occurred at the address E+(m+1)λ. The address E+(m+1) λ is requested for a pre-fetch, and the address E+(m+1) λ is registered in the pre-fetch address queue. As such, the configuration is such that once the pre-fetch control apparatus enters the next-line pre-fetch request mode, a pre-fetch request is made to each address at which a cache miss occurs thereafter.

Figure 2:
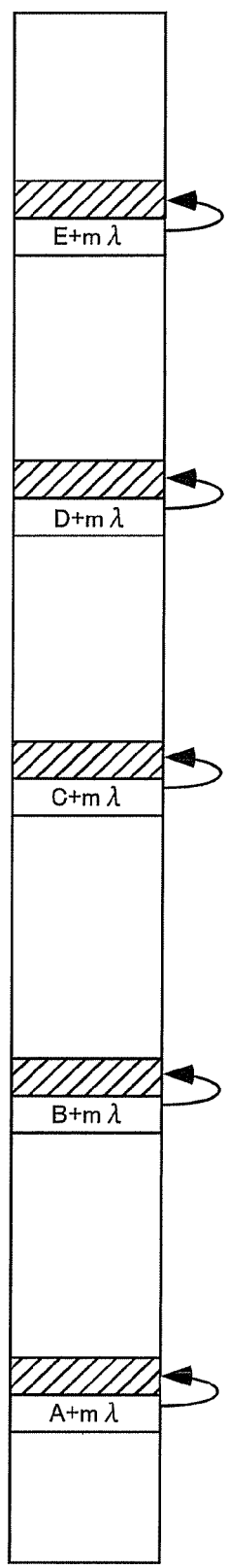
FIG. 2 is a diagram describing an outline of the operation of a preferred embodiment of the present invention (part 2)

The configuration described so far makes it possible to carry out a pre-fetch for all the access addresses at which cache misses have occurred in the next-line pre-fetch request mode on the presumption that the accesses are continuous address accesses even if the access address has not hit the pre-fetch address queue as shown in FIG. 2.

Note that the same reference sign is assigned to the corresponding control signal and address bus in the following description, referring to the accompanying drawings, of the configuration and operation.

Figure 5:
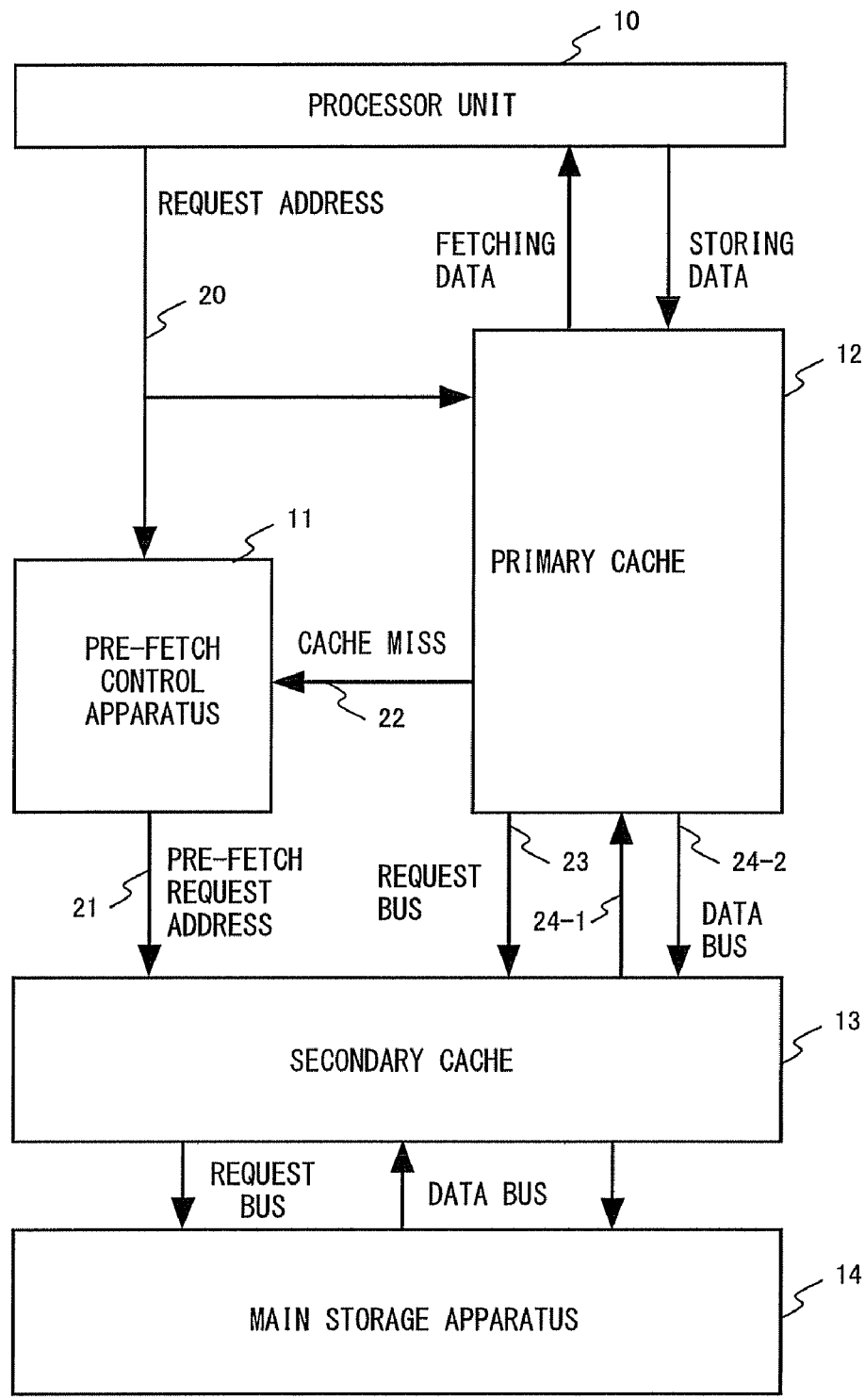
FIG. 5 is a block configuration diagram showing the overall information processing apparatus comprising a pre-fetch control apparatus according to a preferred embodiment of the present invention.

FIG. 5 is a block configuration diagram showing the overall information processing apparatus comprising a pre-fetch control apparatus according to a preferred embodiment of the present invention.

Referring to FIG. 5, the pre-fetch control apparatus 11 is configured to request a secondary cache 13 for a pre-fetch while monitoring the address 20 of a request to a primary cache 12. When data is requested from the processor unit 10 to the primary cache 12 by using the address bus 20, the pre-fetch control apparatus 11 searches the pre-fetch address queue with the same address. Where the address reported through the address bus 20 is X, an address registered in the queue is P, and the block size is λ, the definition is "hit" when the expression $$P \leq X < P + \lambda$$

is true, and in this case a pre-fetch is requested from the secondary cache 13 by using an address bus 21; if there is no hit, a pre-fetch is not requested. In the latter case, when a cache miss is reported by way of a control signal 22, the pre-fetch control apparatus 11 enters the operation of registering the address.

The processor unit 10 sends a request address 20 to the primary cache 12, making a request to fetch data and/or store it. If the request from the processor unit 10 is a data-fetch, the primary cache 12 compares the request address 20 with the address of data stored internally in the primary cache 12 to judge whether or not the requested data exists in the cache itself. If the requested data exists, the primary cache 12 sends it to the processor unit 10. In contrast, if the requested data does not exist, the primary cache 12 sends a cache-miss signal 22 to the pre-fetch control apparatus 11 and also requests the secondary cache 13 to send data to the primary cache 12. This request is made by sending a request signal through a request bus 23. The data exchange between the primary cache 12 and secondary cache 13 is carried out by way of data buses 24-1 and 24-2.

The secondary cache 13 confirms whether or not the data requested from the primary cache 12 exists in the secondary cache 13 and, if the data exists, sends it to the primary cache 12. If the requested data does not exist, then the secondary cache 13 makes a request to the main storage apparatus 14 for the data and then transfers the data obtained therefrom to the primary cache 12.

The pre-fetch control apparatus 11 compares the address registered in the pre-fetch address queue therein and the request address 20 from the processor unit 10, and, if the same address exists, sends an address next to the existing address to the secondary cache 13 as a pre-fetch request address 21 so as to make the secondary cache 13 obtain the data of the present sent address from the main storage apparatus 14.

If a cache miss occurs in the primary cache 12, a signal 22 indicating the cache miss is sent to the pre-fetch control apparatus 11. For the miss-cached address, the primary cache 12 makes a request to the secondary cache 13 for data directly, while an address next to the miss-cached address is stored in the pre-fetch address queue of the pre-fetch control apparatus 11 to be ready to enable an issuance of a pre-fetch request when a similar access occurs thereafter.

The preferred embodiment of the present invention is configured to equip the above described pre-fetch control apparatus 11 with the next-line pre-fetch control apparatus, to judge that it is in a state in which there is a large number of accesses from the processor unit 10 to continuous addresses if there have been a predefined number of accesses to continuous addresses including the address that has overflowed from the pre-fetch address queue, and to carry out a pre-fetch even if a cache miss occurs at an address not existing in the pre-fetch address queue.

FIG. 6 is a diagram showing the internal configuration of the pre-fetch control apparatus shown in FIG. 5.

First, the access address reported by way of the address bus 20 is once recorded in a register 25. Each entry address of a pre-fetch address queue 26 is compared with the register 25. If there is a hit, the entry address is read by a register 27 thereafter. The value of the register 27 and a block size λ are added at an adder 28 to calculate an address next to the address retained by the register 27. The calculated address is written to a register 30 by way of an address bus 29, and is led through the address bus 21, changing to a pre-fetch request address. In this event, a selector 31 is controlled so as to select the address bus 29 by means of a control signal 32 so that the output address of the adder 28 is registered in the pre-fetch address queue 26 by way of an address bus 43.

In contrast, if there is no hit in the address search of the pre-fetch address queue 26, an entry is not read and therefore nothing is carried out. If it is reported by way of a control signal 22 that a cache miss has occurred at the access address, however, a control signal 33 instructs a register 34 to register, in itself, the address recorded in the register 25. A standby bit being set if the address is registered, the register 34 makes a request, using a control signal 34, to the pre-fetch address queue 26 for a new registration. If there is no registration from the address bus 29, the pre-fetch address queue 26 permits a registration and resets the standby bit by means of a control signal 35. In this event, the pre-fetch address queue 26 performs a control, by means of the control signal 32, so as to make a selector 31 select an address bus 36 and registers, to the pre-fetch address queue 26 by way of the address bus 43, an address that is obtained by an adder 37 adding the block size λ to the value registered in the register 34.

Addresses are registered in the pre-fetch address queue 26 thereafter and, when it becomes full with the registered addresses, an overflowed address is set to the next-line pre-fetch control apparatus 38 by way of an address bus 39. A control signal 41 is used for controlling a write of an address to the next-line pre-fetch control apparatus 38.

The address retained in the register 25 is input not only to the register 34 and pre-fetch address queue 26, by way of an address bus 44, but also to the next-line pre-fetch control apparatus 38. If the address is identical to that stored in the next-line pre-fetch control apparatus 38, the block size λ is added to the present address within the present next-line pre-fetch control apparatus 38, and the post-addition address is once again stored within the next-line pre-fetch control apparatus 38. The number of times in which addresses are identical is counted in the next-line pre-fetch control apparatus 38 so that, when the counted number reaches a predetermined number, a control signal 40 for instructing the pre-fetch address queue 26 to enter a next-line pre-fetch mode is sent thereto. Having entered the next-line pre-fetch request mode, the pre-fetch address queue 26 uses the control signal 32 to make the selector 31 select an address bus 42 and to make the address retained in the register 34 be input directly into the pre-fetch address queue 26 by way of the address bus 43. The address directly input into the pre-fetch address queue 26 is input into the adder 28 by way of the register 27, is converted by adding the block size λ and then is output, as a pre-fetch request address, to the address bus 21 by way of the register 30.

Figure 8:
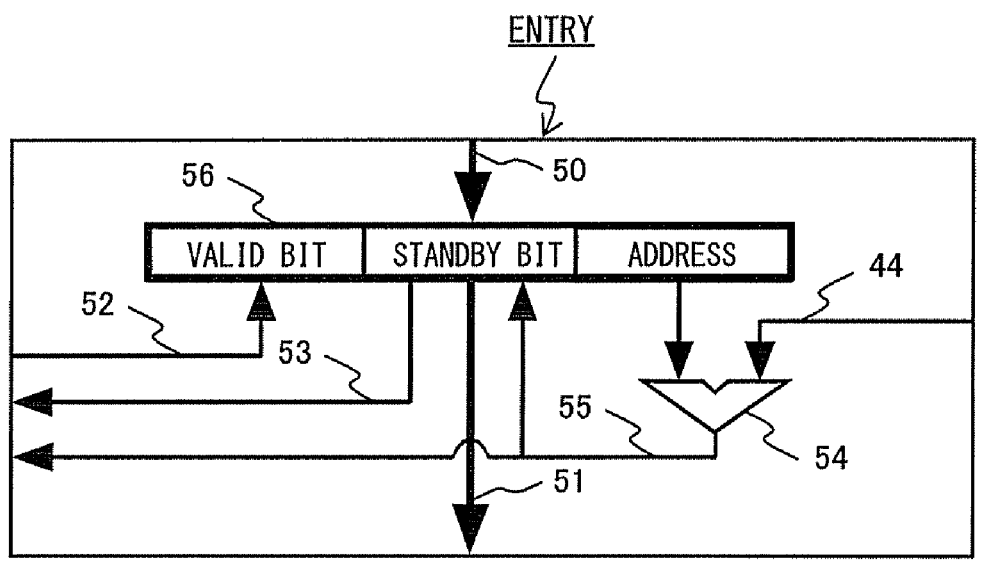
FIG. 8 is a diagram showing the configuration of the pre-fetch address queue shown in FIG. 6 (part 2)

FIGS. 7 and 8 are diagrams showing the configuration of the pre-fetch address queue shown in FIG. 6.

The pre-fetch address queue of FIG. 7 comprises a plurality of entries configured as shown in FIG. 8.

Referring to FIG. 8, a registration address is input into a register 56 by way of an address bus 50. A valid bit indicating the validity of an address is set to the register 56 by means of a control signal 52. A standby bit indicates that an entry is on standby for a pre-fetch, and a control signal 53 indicates the state of the standby bit. A request address is input into a comparator 54 by way of an address bus 44 and is compared with the address retained in the register 56. If both addresses are identical as a result of the comparison, a control signal 55 is issued to set the standby bit and also to report, to a pre-fetch address queue control unit 60, the fact that the comparison result shows the identicalness.

The operation of the pre-fetch address queue shown in FIG. 7 is as follows. An access address is compared at the comparator 54, by way of the address bus 44, with the address retained in the register 56. If the address hits an entry in which a valid bit is set, the standby bit of the entry 56 is set. The standby bit is collected from each entry by means of the control signals 53 (i.e., 53-1 through 53-4), is read by the pre-fetch address queue control unit 60, and is used for determining an entry to be read from. When an entry is determined, a selector 61 is controlled by means of a control signal 63 to read the entry and also to reset a valid bit by means of the control signals 52 (i.e., 52-1 through 52-4). Further, when a cache miss is reported by way of a control signal 22, the pre-fetch address queue control unit 60 collects the result of address comparison for each entry from control signals 55 (i.e., 55-1 through 55-4) and, if there are no hits in any entry, uses the control signal 33 and instructs the register 34 to register the address retained in the register 25. When a registration is requested from the register 34 using the control signal 34, or immediately after a readout address from the pre-fetch address queue is stored in a register 27, the pre-fetch address queue control unit 60 controls a selector 62-1 by using a control signal 64-1 so as to select the address bus 43 and registers the value of the address bus 43 in the entry. If the valid bit of the entry 1 is set in this event, the pre-fetch address queue control unit 60 controls a selector 62-2 by using a control signal 64-2 to set the value in the entry 2. The pre-fetch address queue control unit 60 carries out similar operations for entries 3 and 4. An address overflowed from the entry 4 is output to the address bus 39. In other cases, the selectors 62-1 through 62-4 are controlled so as to rewrite data to each entry. That is, while respective addresses are output from entries 1 through 4 in each machine cycle, the selectors 62-1 through 62-4 input the output of entries 1 through 4 once again into the respective entries 1 through 4 so as to enable each entry to retain the same respective value over a plurality of machine cycles.

If there are five or more series of continuous accesses to the number of entries being four as shown in FIG. 7, an entry or entries are overflowed from the pre-fetch address queue before hitting thereat, and consequently the pre-fetch control apparatus does not function effectively. Accordingly, a next-line pre-fetch control apparatus 38 is added as shown in FIG. 6 so that it is controlled so as to pre-fetch an address obtained by adding a block size λ to a miss-cached address under a specific condition.

FIG. 9 is a diagram showing the configuration of the next-line pre-fetch control apparatus.

First, having detected the pre-fetch address queue being overflowed, the pre-fetch address queue control unit 60 instructs the registration of the overflowed address in the next-line pre-fetch control apparatus by using a control signal 41. Having received the instruction, a control circuit 70 controls a selector 73 so as to select an address bus 39 by using a control signal 72 if a valid bit 71 is not set, and sets a valid bit 71 by setting the address in an address register 75 by using a control signal 74.

If the information of the valid bit is reported to the control circuit 70 by means of a control signal 76 and if the valid bit is set, a registration is not carried out even if there has been a request for registering an address anew by means of the control signal 41. Meanwhile, while the valid bit is being set, an instruction is given so as increase the count on a counter 1 for each cycle by means of a control signal 77. If there has been a cache access during the period of an address being registered, an address 78 and an access address 44 are compared to each other. If there is a hit, it is reported to the control circuit 70 by means of a control signal 79 and it is reported to the control circuit 70. In this event, the control circuit 70 controls a control signal 72, performs a control so as to select an address 81 obtained by an adder 80 adding the block size λ to the address 78, and instructs an update of the register 75 by means of a control signal 74.

At the same time, an instruction is given to reset the counter 1 to "0" by means of a control signal 82 and another instruction is given to increase the count on the counter 2 by means of a control signal 83. Such operations cause the counter 1 to count the number of cycles from one hit to the next hit, and the counter 2 to count the number of hits. When the counter 2 reaches a certain threshold value m as a result of repeating the hits, this fact is reported to the control circuit by means of a control signal 84. Having the count value reach the threshold value m, the counter 2, instead of counting up, retains the value until it is reset. While the counter retains the threshold value m, the control circuit 70 instructs the pre-fetch address queue control unit G0 to perform a next-line pre-fetch by using a control signal 40.

During the period of validity of the control signal 40, which is a next-line pre-fetch valid signal, the pre-fetch address queue 26 is controlled as described below. First, if a miss-cached address does not hit the pre-fetch address queue 26, the address is registered to the pre-fetch address queue 26 from the cache-miss address register 34 shown in FIG. 6, in which event the selector 31 is controlled by using the control signal 32 to select an address 42. By so doing, the miss-cached address is registered, as is, in the pre-fetch address queue 26. Further, when registered, the standby bit of the register 56 shown in FIG. 8 is set. Since the standby bit is set, the entry is read and the address is set to the register 27 shown in FIG. 6. Then, the block size λ is added at the adder 28 shown in FIG. 6 and the result is set to the register 30 shown in FIG. 6. Using the address, a pre-fetch is requested from the secondary cache 13 by way of the address bus 21.

As described above, the control is such that, while the counter 2 retains the threshold value m, all addresses, each of which are obtained by adding the block size λ to each respective miss-cached address, are pre-fetched. Further, when the counter 1, which counts the number of cycles between hitting the address 75 stored in the next-line pre-fetch control apparatus 38 and the next occurrence of hitting an address, reaches a certain threshold value n, the event is reported to the control circuit by means of a control signal 85. In this event, the control circuit 70 resets the counter 1 to "0" by using a control signal 82 and resets the counter 2 to "0" by using a control signal 86. It also resets the valid bit 71 by using a control signal 87. This configuration prevents a limitless number of requests for next-line pre-fetches from occurring.

FIGS. 10 through 14 are time charts describing the operation of the pre-fetch control apparatus according to the preferred embodiment of the present invention.

Figure 10:
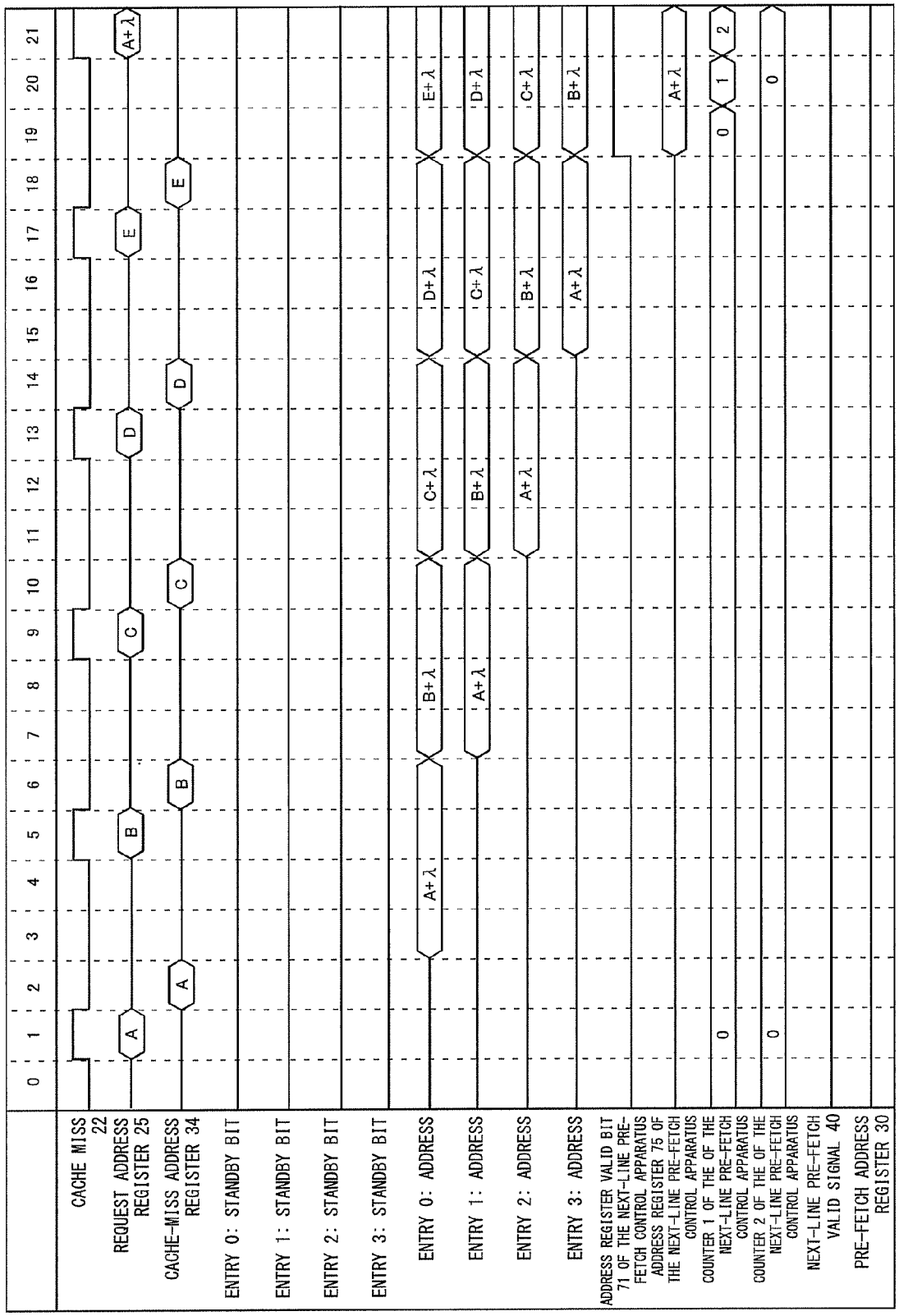
FIG. 10 is a time chart describing the operation of a pre-fetch control apparatus according to a preferred embodiment of the present invention (part 1)
Figure 11:
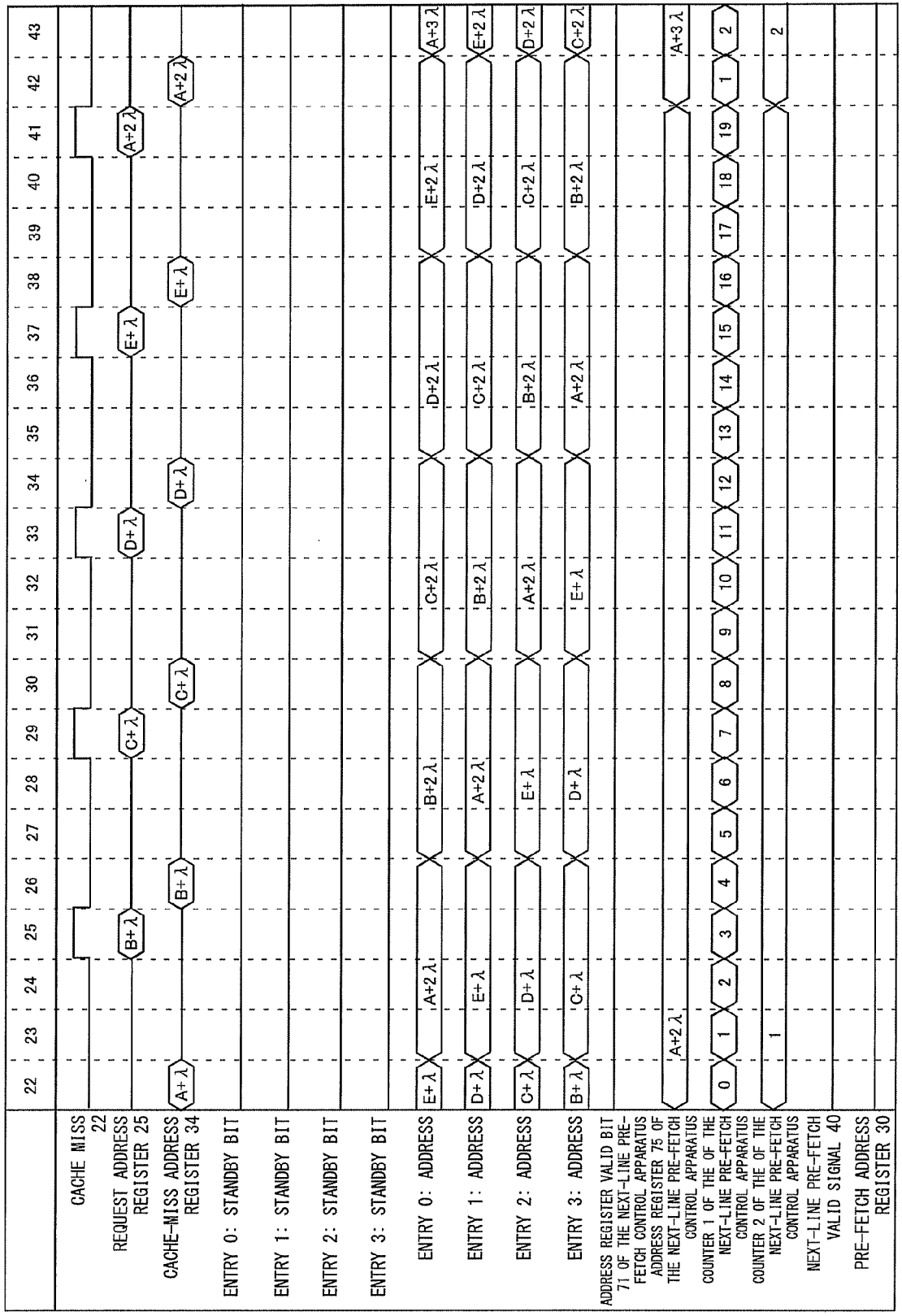
FIG. 11 is a time chart describing the operation of a pre-fetch control apparatus according to a preferred embodiment of the present invention (part 2)

FIGS. 10 and 11 show time charts in the case of carrying out sequentially continuous accesses starting from addresses A, B, C, D and E.

First, referring to FIG. 10, there is an access at address A in cycle 1, generating a cache-miss signal 22. As a result, address A is registered in the cache-miss address register 34, and an address A+λ is registered to entry 0 of the pre-fetch address queue in cycle 3. Addresses B, C and D are accessed in the respective cycles 5, 9 and 13, with the respective cache miss resulting. Further at the time of cycle 15, the addresses D+λ, C+λ, B+λ and A+λ are stored in the entries 0, 1, 2, and 3, respectively, of the pre-fetch address queue.

In this state, if there is an access with address E in cycle 17, generating a cache miss, the pre-fetch address queue is overflowed and the address A+λ is set to the address register 75 of the next-line pre-fetch control apparatus. An address register valid bit 71 changes to valid in this cycle and the counter 1 starts counting.

In cycle 21, there is an access to the address A+λ, hitting the address register 75. As a result, the address register 75 is updated to A+2λ, the counter 1 is reset, and counter 2 increases its count up to "1" in cycle 22, shown in FIG. 11.

Figure 12:
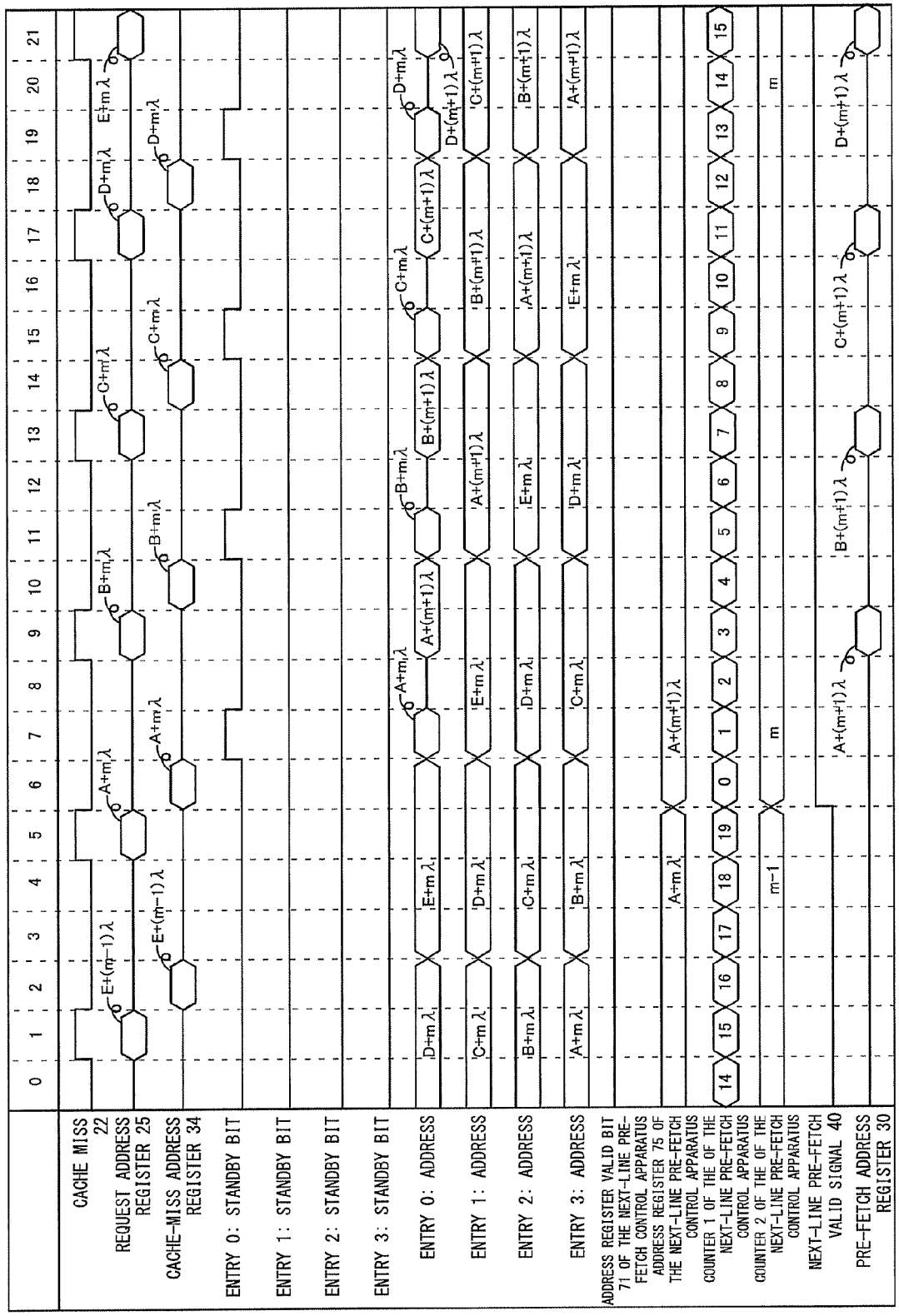
FIG. 12 is a time chart describing the operation of a pre-fetch control apparatus according to a preferred embodiment of the present invention (part 3)
Figure 13:
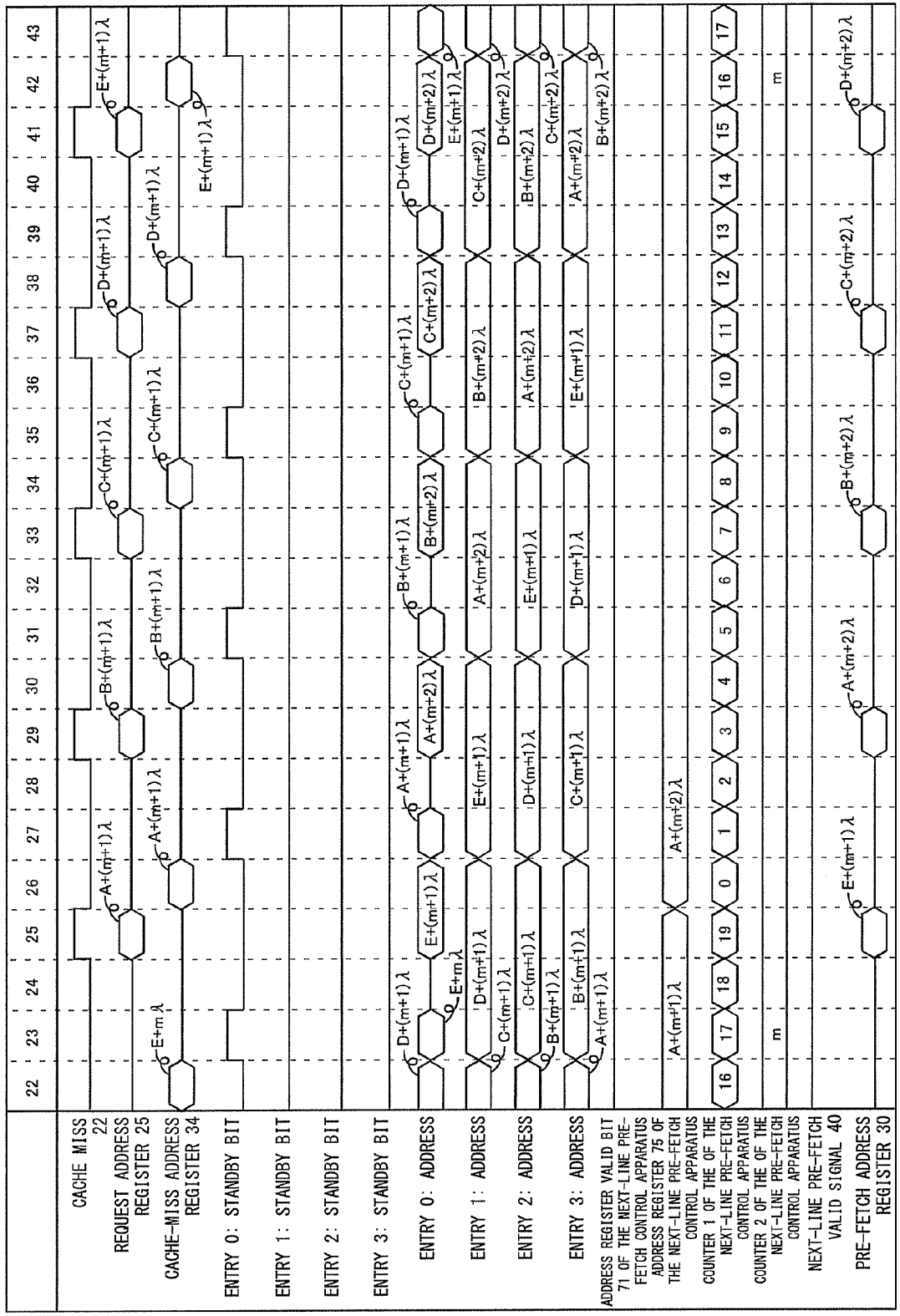
FIG. 13 is a time chart describing the operation of a pre-fetch control apparatus according to a preferred embodiment of the present invention (part 4)

FIGS. 12 and 13 show time charts starting from the state in which an access address has hit the address retained by the address register 75 of the next-line pre-fetch control apparatus m−1 times resulting from similar accesses having been likewise carried out.

There is an access with an address A+mλ, hitting the address register 75, in cycle 5 shown in FIG. 12. Then, the address register 75 is updated to A+(m+1)λ, and the count of the counter 2 is increased to "m" in cycle 6. A next-line pre-fetch valid signal 40 is enabled by the counter 2 increasing its count up to the threshold value m. As a result, the address that is set to the entry 0 changes to an access address A+mλ in cycle 7. At the same time, the standby bit of entry 0 is also set. The address in entry 0 is read in cycle 8, and an address A+(m+1)λ is set to the pre-fetch address register 30 in cycle 9. At the same time, the same address is rewritten to entry 0. A pre-fetch is carried out for the address that is set to the pre-fetch address register 30. This pre-fetch is a next-line pre-fetch. Hereafter, a next-line pre-fetch is requested from a likewise miss-cached address.

In cycle 25 shown in FIG. 13, although the address register 75 is hit, only the address register is updated and also the counter is reset. Counter 2, however, remains unchanged from the count value "m" (that is, counter 2 neither increases its count nor is reset). As for the address A+(m+1) λ that has hit the address register 75, a next-line pre-fetch is carried out in the same manner for another address.

Figure 14:
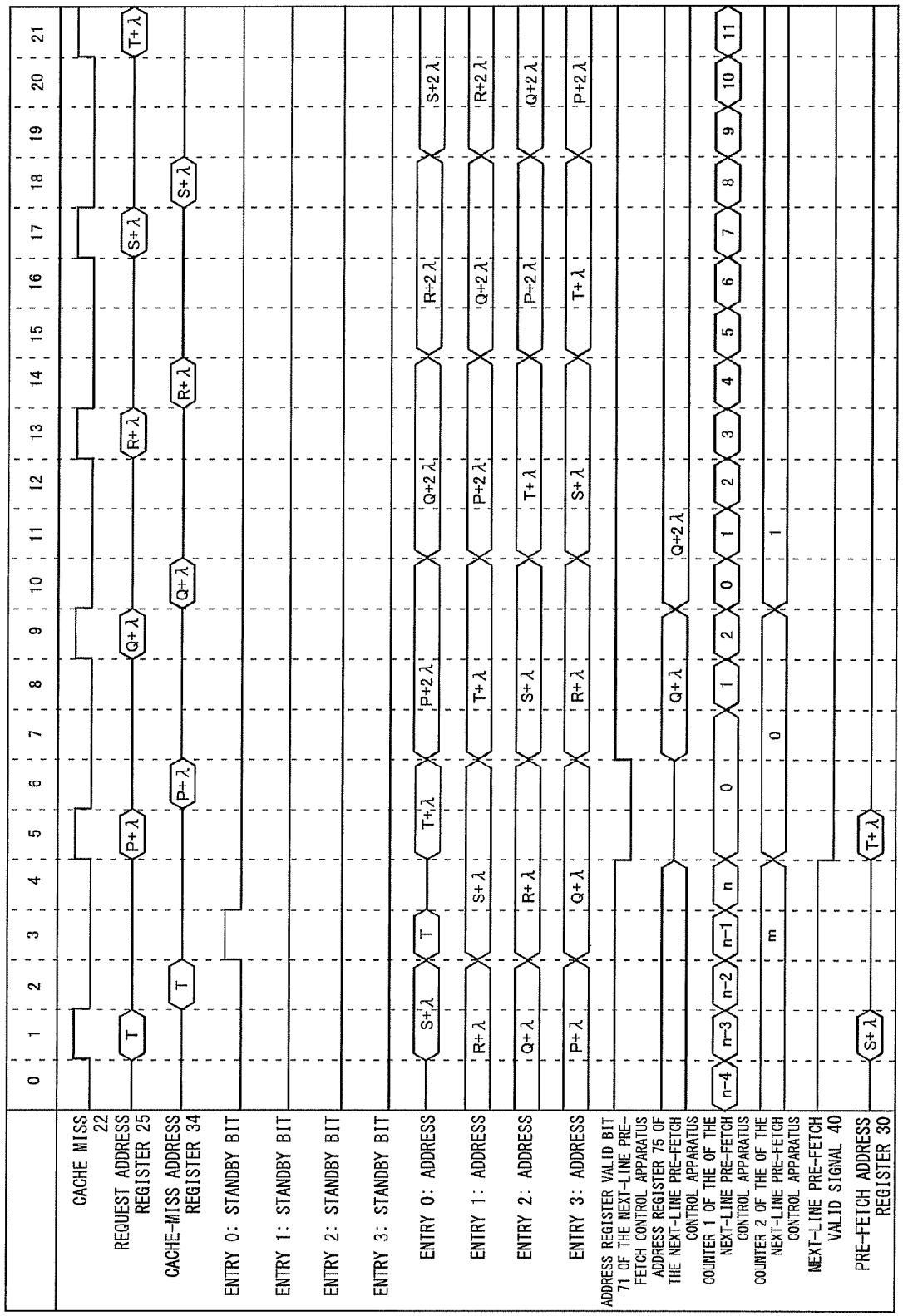
FIG. 14 is a time chart describing the operation of a pre-fetch control apparatus according to a preferred embodiment of the present invention (part 5).

Further, FIG. 14 shows a time chart starting from the state in which similar accesses have continued to complete a series of continuous accesses, followed by continuous accesses starting from new addresses P, Q, R, S and T.

There are no hits because the access is with a different address than that when the address register 75 so that the counter 1 keeps counting up until it reaches a threshold value n in cycle 4. Therefore, counter 1, counter 2 and the valid bit 71 of the address register are reset in cycle 5, and a next-line pre-fetch valid signal 40 changes to invalid. In this state, a new address can now be registered from the pre-fetch address queue so that a next-line pre-fetch is no longer carried out. An address is overflowed from the pre-fetch address queue, and an address Q+λ is registered to the address register 75 in cycle 7. The operations hereafter are the same as those described above.

What is claimed is:

1. A pre-fetch control apparatus controlling a pre-fetch from a main storage apparatus to cache memory in an information processing apparatus comprising the main storage apparatus, cache memory and a processor, comprising:
   a pre-fetch address queue unit for storing a plurality of addresses used for comparison with an address of an access from the processor in order to request a pre-fetch from the cache memory; and
   a next-line pre-fetch control unit for storing an address overflowed from the pre-fetch address queue unit, rewriting the address to the following address if the processor has accessed an address identical with the stored address, and carrying out a next-line pre-fetch that is pre-fetching the address following an access address that has been miss-cached thereafter if there have been a predetermined number of continuous accesses from the processor to the address identical with the stored address.

2. The pre-fetch control apparatus according to claim 1, wherein
   in a count-up of said predetermined number of said continuous accesses, a count value starts to be increased when an access occurs, and that the accesses are continuous, is determined if the next access occurs before the count value reaches a predetermined number.

3. The pre-fetch control apparatus according to claim 2, wherein
   said next-line pre-fetch operation is disengaged if said count value reaches a predetermined value.

4. The pre-fetch control apparatus according to claim 1, wherein
   said next-line pre-fetch operation stores a miss-cached access address in said pre-fetch address queue unit and performs a pre-fetch request to said cache memory without performing a comparison with an access address from said processor.

5. The pre-fetch control apparatus according to claim 1, wherein
   said following address is a value obtained by adding the size of a data block, which is a storage unit of data of cache memory, to an original address.

6. The pre-fetch control apparatus according to claim 1, wherein
   said cache memory is constituted by the primary cache and secondary cache, wherein
   said pre-fetch makes the secondary cache fetch data from said main storage for a cache miss occurring in the primary cache.

7. A control method used for a pre-fetch control apparatus comprising a pre-fetch address queue unit for storing a plurality of addresses used for comparison with an address of an access from a processor in order for a main storage apparatus to request cache memory for a pre-fetch in an information processing apparatus that comprises the main storage apparatus, cache memory and the processor, comprising:
   storing an address overflowed from the pre-fetch address queue unit;
   rewriting the address to the following address if the processor has accessed an address identical with the stored address; and
   carrying out a next-line pre-fetching, that is, pre-fetching the address following an access address that has been miss-cached thereafter if there have been a predetermined number of continuous accesses from the processor to an address
   identical with the stored address.

* * * * *